US008786984B2

(12) United States Patent
Das et al.

(10) Patent No.: US 8,786,984 B2
(45) Date of Patent: Jul. 22, 2014

(54) PERPENDICULAR MAGNETIC WRITE HEAD HAVING A CURRENT CARRYING ELEMENT FOR IN-PLANE FIELD ASSISTED MAGNETIC RECORDING

(75) Inventors: Sarbanoo Das, Sagamihara (JP); Masafumi Mochizuki, Chigasaki (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/297,106

(22) Filed: Nov. 15, 2011

(65) Prior Publication Data

US 2013/0120869 A1    May 16, 2013

(51) Int. Cl.
*G11B 5/127* (2006.01)

(52) U.S. Cl.
USPC ............... 360/125.31; 360/110; 360/125.32

(58) Field of Classification Search
USPC ....................... 360/110, 125.31, 125.32
See application file for complete search history.

(56) References Cited

U.S. PATENT DOCUMENTS

| | | | | |
|---|---|---|---|---|
| 6,665,136 B2 * | 12/2003 | Clinton et al. | .................. | 360/55 |
| 6,671,127 B2 * | 12/2003 | Hsu et al. | ................. | 360/125.75 |
| 6,833,980 B1 | 12/2004 | Tsukagoshi et al. | | |
| 6,878,444 B2 | 4/2005 | Suzuki et al. | | |
| 6,917,493 B2 | 7/2005 | Clinton et al. | | |
| 6,985,318 B2 | 1/2006 | Clinton et al. | | |
| 7,126,790 B1 * | 10/2006 | Liu et al. | .................. | 360/125.53 |
| 7,149,055 B2 | 12/2006 | Clinton et al. | | |
| 7,190,539 B1 * | 3/2007 | Nibarger | ......................... | 360/59 |
| 7,212,367 B2 | 5/2007 | Clinton et al. | | |
| 7,633,715 B2 * | 12/2009 | Higuchi | ..................... | 360/125.74 |
| 8,264,916 B1 * | 9/2012 | Aoyama et al. | ............. | 369/13.13 |
| 2008/0117545 A1 * | 5/2008 | Batra et al. | ................. | 360/125.01 |
| 2008/0218891 A1 | 9/2008 | Gubbins et al. | | |
| 2008/0225435 A1 * | 9/2008 | Hou et al. | ...................... | 360/110 |

(Continued)

FOREIGN PATENT DOCUMENTS

JP    2004/335259 A    11/2004

OTHER PUBLICATIONS

International Business Machines Corporation, "Contact wear-tolerant two-stripes nanoheater assembly for small-spot heating and thermal-assisted magnetic writing on disk," Kenneth Mason Publications Ltd., Research Disclosure Database No. 457206, Published May 2002, pp. 1-4.

(Continued)

*Primary Examiner* — Wayne Young
*Assistant Examiner* — Carlos E Garcia
(74) *Attorney, Agent, or Firm* — Zilka-Kotab, PC

(57) ABSTRACT

In one embodiment, a magnetic head includes a main pole configured to produce a magnetic writing field applied to a magnetic medium at an overall angle with respect to a magnetic anisotropy axis which is oriented in a direction perpendicular to a plane of a surface of the magnetic medium, and at least one current carrying element positioned near a media facing surface of the main pole configured to produce an assisting magnetic field applied in a cross-track direction parallel to the plane of the surface of the magnetic medium. In another embodiment, a method includes applying a writing magnetic field to write data to a magnetic medium and applying an assisting magnetic field to the magnetic medium for assisting the writing magnetic field, the assisting magnetic field being applied in a cross-track direction of the magnetic medium and parallel to a plane of a surface of the magnetic medium.

20 Claims, 14 Drawing Sheets

(56) References Cited

U.S. PATENT DOCUMENTS

| | | |
|---|---|---|
| 2009/0002883 A1 | 1/2009 | Ionescu et al. |
| 2009/0262457 A1 | 10/2009 | Rivkin et al. |
| 2009/0285082 A1 | 11/2009 | Ko et al. |
| 2010/0220415 A1 | 9/2010 | Yamada et al. |

OTHER PUBLICATIONS

Zhu et al., "Microwave Assisted Magnetic Recording," 2007 IEEE, IEEE Transactions on Magnetics, vol. 44, No. 1, Jan. 2008, pp. 125-131.

Matsumoto et al., "Highly efficient probe with a wedge-shaped metallic plate for high density near-field optical recording," 2004 American Institute of Physics, Journal of Applied Physics, Apr. 15, 2004, vol. 95, No. 8, pp. 3901-3906.

Wei et al., "Reliability and current carrying capacity of carbon nanotubes," 2001 American Institute of Physics, Applied Physics Letters, Aug. 20, 2001, vol. 79, No. 8, pp. 1172-1174.

Zhang et al. "Controlling the growth of vertically oriented single-walled carbon nanotubes by varying the density of Co-Mo catalyst particles," 2006 Elsevier B.V., Chemical Physics Letters, vol. 422, pp. 198-203.

\* cited by examiner

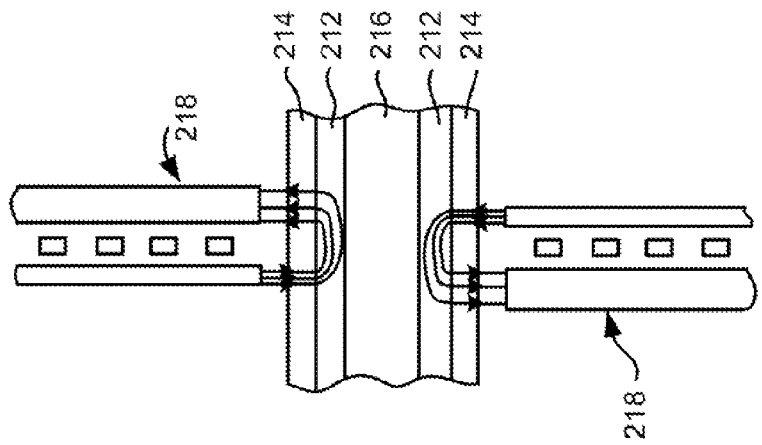
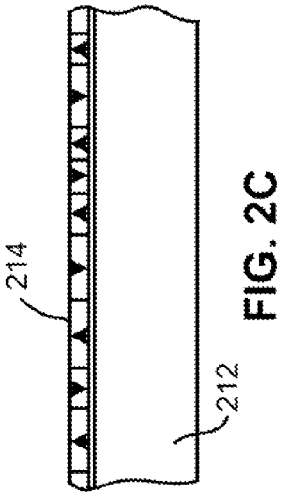
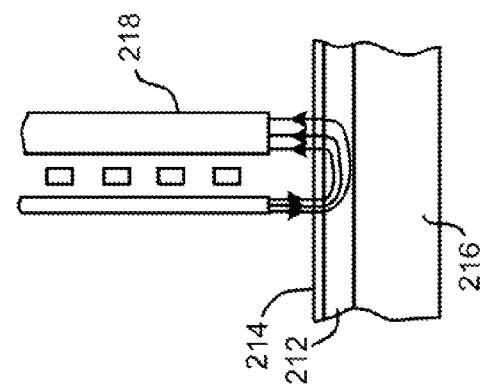
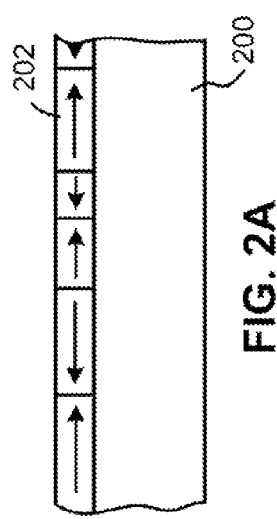
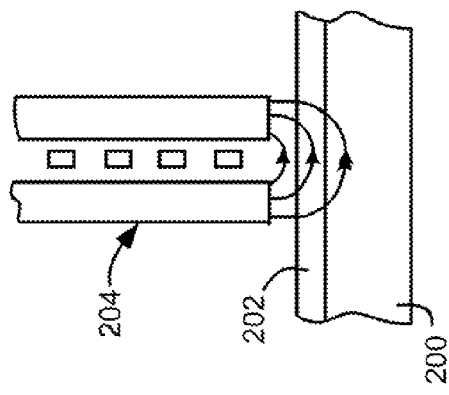

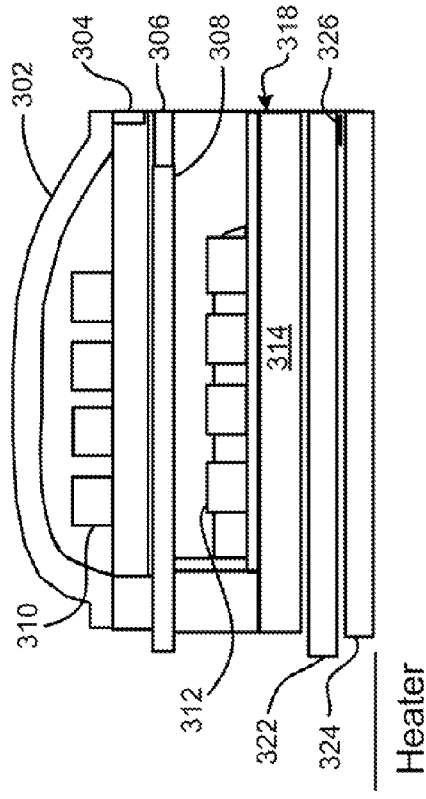
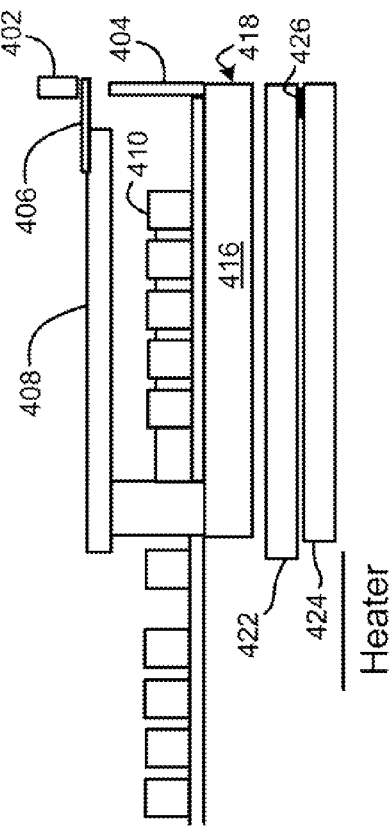
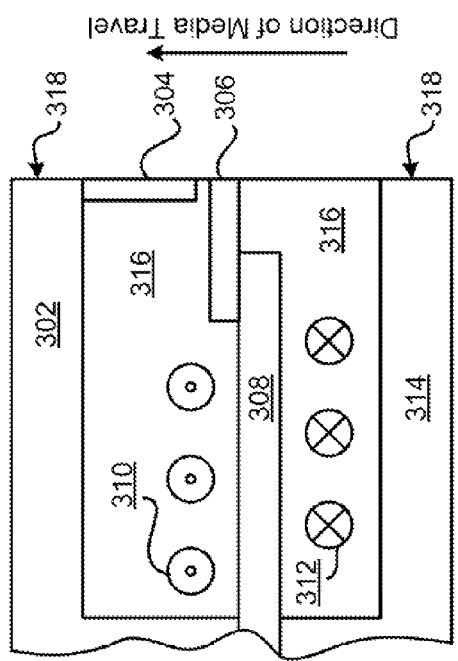
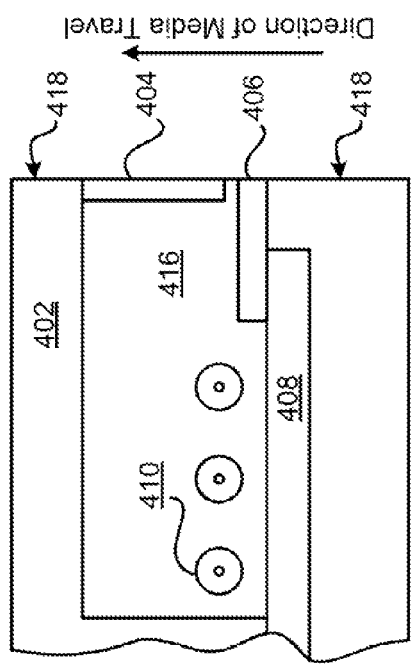

PERPENDICULAR MAGNETIC WRITE HEAD HAVING A CURRENT CARRYING ELEMENT FOR IN-PLANE FIELD ASSISTED MAGNETIC RECORDING

FIELD OF THE INVENTION

The present application relates to perpendicular magnetic write heads, and particularly to write heads having a current carrying element for use in in-plane field assisted magnetic recording.

BACKGROUND

Increases in the demand for magnetic storage capacity has resulted in a need for an increase in the areal-density (data recorded per unit area) of hard disk drives (HDDs) and other storage devices. Increases in both track density (defined by the number of tracks per unit length along the radial direction) and bit density (defined by the number of bits per unit length along the track direction) are helpful in enhancing the areal-density of the HDD. These two factors point toward decreasing bit size recorded on the disk, and one of the ways to record smaller bits is to scale down the dimension of a writer used in the recording.

In current HDD designs, a magnetic pole type writer is used to record data on a magnetic disk, which comprises grains with magnetic anisotropy along a direction perpendicular to the disk surface. Magnetic flux from the center of the writer emanates basically along the direction perpendicular to the disk surface, while that emanating from the edge makes an angle to the direction perpendicular to the disk surface. Once the field emanating from the surface of a main pole tip is large enough to overcome the "barrier," defined mainly by the magnetic anisotropy energy ($K_u$) of the grain, magnetization in the grain reverses to the opposite direction and a bit may be recorded thereby. The larger the magnetic field emanating from a writer, the easier it becomes to record the bit. However, intensity of the magnetic field from the writer depends strongly on the pole geometry and dimension. In general, total magnetic flux from a writer decreases while the main pole tip surface is decreased in order to scale down to record smaller bits, which in consequence causes a lack of sufficient head field to record bits.

On the other hand, it is important to reduce the diameter of the magnetic grains of a recording layer in the magnetic disk in order to reduce the bit size and ensure higher signal-to-noise ratio (SNR) in the high areal-density region. However, a reduction of grain size makes the magnetic grain thermally unstable, which makes the increase of magnetic anisotropy energy $K_u$ indispensable for the assurance of thermal stability. Unfortunately, increasing $K_u$ of a magnetic grain requires more magnetic field from the writer to reverse the magnetization. Thus, recording with a writer with a scaled down main pole tip on a magnetic medium with a higher $K_u$ becomes more difficult.

A number of solutions that result in an improvement of the writer and the magnetic recording layer itself are already in use. Beside these solutions, "energy assisted recording" is proposed to overcome the problem of recording with limited magnetic field from a scaled down writer. The concept of this method is to supply extra energy to the medium magnetization prior to attempting to write. Among the energy assisted recording methods, thermal assisted recording (TAR) and microwave assisted magnetic recording (MAMR) probably have the most potential.

In TAR, a laser beam or high energy light, such as from a semiconductor laser diode, is guided through a wave-guide and then applied to the medium in order to increase the temperature of the medium and thermal fluctuation of magnetization. As the applied heat makes the magnetization in the recording layer fluctuate and reduces the switching field, a head field from a writer records the bit to a desired direction. In currently used TAR, a laser device is used to apply heat to the recording medium. A laser wave is guided through a wave-guide and projected on to a metal aperture, which concentrates the laser energy and transmits heat to the medium. For such a configuration, precise alignment of the laser guide and aperture is important. Variation of alignment between laser wave-guide and aperture may be a significant problem in high-volume production. Moreover, if not precisely controlled, heat passing through the wave-guide could burn the surrounding parts that comprise the head, ultimately damaging the device. Furthermore, there is a risk of corrosion of the medium itself and degradation of the medium surface due to the increase in temperature.

In MAMR, a microwave magnetic field is generated by a flux generating element positioned near to the writer main pole. As the microwave magnetic field causes oscillation of magnetization in the recording layer of the medium, a head field from a writer switches the magnetization to a desired direction. In typical MAMR, a field generating layer (FGL) is used to generate microwaves to assist recording. Stable oscillation of the FGL magnetization is a pre-requisite for MAMR and to ensure good FGL performance, several magnetic layers stacked close to the FGL are typically used. This makes the writer structure complicated and there is a risk of variation in the stability of the FGL performance, which may adversely affect the writer performance.

SUMMARY

In one embodiment, a magnetic head includes a main pole configured to produce a magnetic writing field applied to a magnetic medium at an overall angle with respect to a magnetic anisotropy axis, the magnetic anisotropy axis being oriented in a direction perpendicular to a plane of a surface of the magnetic medium, and at least one current carrying element positioned near a media facing surface of the main pole configured to produce an assisting magnetic field applied in a cross-track direction parallel to the plane of the surface of the magnetic medium.

In another embodiment, a method includes applying a writing magnetic field to a magnetic medium for writing data to the magnetic medium and applying an assisting magnetic field to the magnetic medium for assisting the writing magnetic field, wherein the assisting magnetic field is applied in a cross-track direction of the magnetic medium and parallel to a plane of a surface of the magnetic medium.

In yet another embodiment, a magnetic data storage system includes a magnetic medium, at least one magnetic head, a drive mechanism for passing the magnetic medium over the at least one magnetic head, and a controller electrically coupled to the at least one magnetic head for controlling operation of the at least one magnetic head. The at least one magnetic head includes a main pole configured to produce a magnetic writing field applied to the magnetic medium at an overall angle with respect to a magnetic anisotropy axis which is in a direction perpendicular to a plane of a surface of the magnetic medium, at least one current carrying element positioned near a media facing surface of the main pole configured to produce an assisting magnetic field applied in a cross-track direction parallel to the plane of the surface of the magnetic medium, an insulator layer positioned between the at least one current carrying element and the main pole, electro-conductive connectors positioned on each longitudinal end of the at least one current carrying element, a trailing shield positioned on a trailing side of the main pole, a leading shield positioned on a leading side of the main pole, and side shields positioned on either side of the main pole in the cross-track direction. The overall angle is between about 25° and about 45° and the at least one current carrying element includes a bundle of carbon nanotubes, while a portion of the magnetic writing field emanates from edges of the main pole and is applied at an angle to perpendicular to the plane of the surface of the magnetic medium, wherein the angle to perpendicular is between about 10° and about 90°.

Any of these embodiments may be implemented in a magnetic data storage system such as a disk drive system, which may include a magnetic head, a drive mechanism for passing a magnetic storage medium (e.g., hard disk) over the head, and a control unit electrically coupled to the head for controlling operation of the head.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

Figure 1:
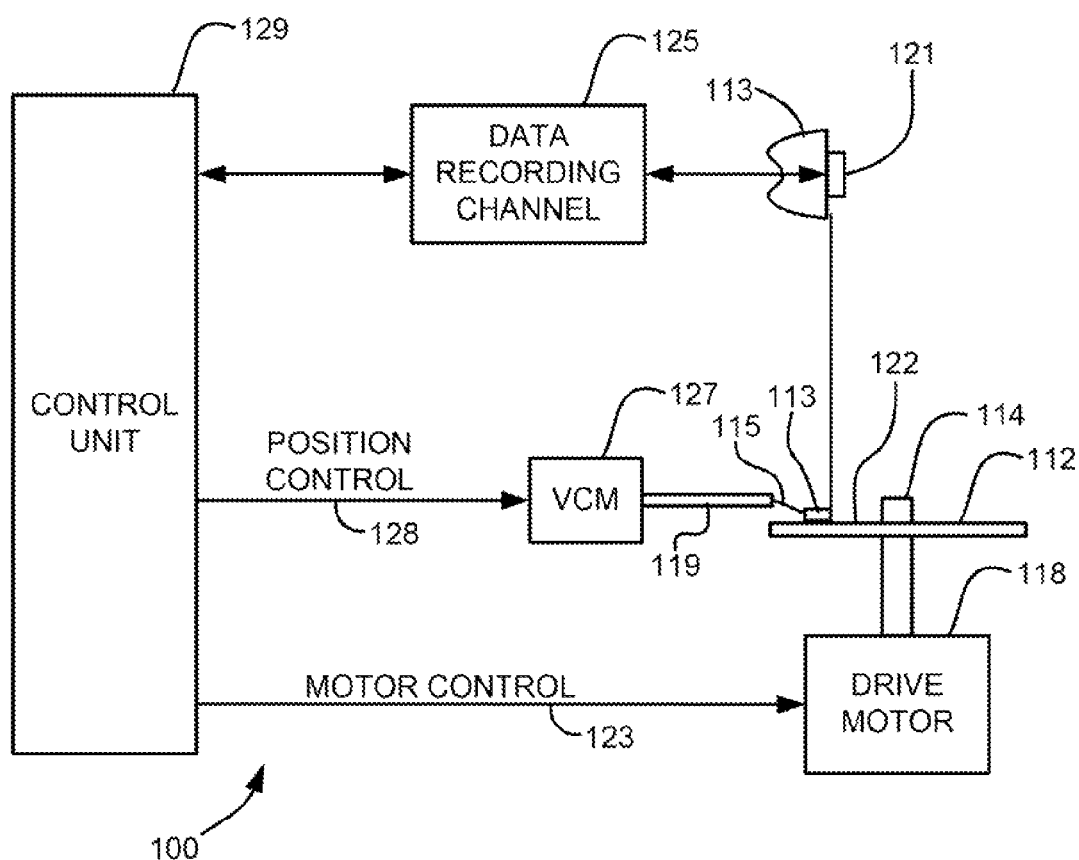
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a magnetic head includes a main pole configured to produce a magnetic writing field applied to a magnetic medium at an overall angle with respect to a magnetic anisotropy axis, the magnetic anisotropy axis being oriented in a direction perpendicular to a plane of a surface of the magnetic medium, and at least one current carrying element positioned near a media facing surface of the main pole configured to produce an assisting magnetic field applied in a cross-track direction parallel to the plane of the surface of the magnetic medium.

In another general embodiment, a method includes applying a writing magnetic field to a magnetic medium for writing data to the magnetic medium and applying an assisting magnetic field to the magnetic medium for assisting the writing magnetic field, wherein the assisting magnetic field is applied in a cross-track direction of the magnetic medium and parallel to a plane of a surface of the magnetic medium.

In yet another general embodiment, a magnetic data storage system includes a magnetic medium, at least one magnetic head, a drive mechanism for passing the magnetic medium over the at least one magnetic head, and a controller electrically coupled to the at least one magnetic head for controlling operation of the at least one magnetic head. The at least one magnetic head includes a main pole configured to produce a magnetic writing field applied to the magnetic medium at an overall angle with respect to a magnetic anisotropy axis which is in a direction perpendicular to a plane of a surface of the magnetic medium, at least one current carrying element positioned near a media facing surface of the main pole configured to produce an assisting magnetic field applied in a cross-track direction parallel to the plane of the surface of the magnetic medium, an insulator layer positioned between the at least one current carrying element and the main pole, electro-conductive connectors positioned on each longitudinal end of the at least one current carrying element, a trailing shield positioned on a trailing side of the main pole, a leading shield positioned on a leading side of the main pole, and side shields positioned on either side of the main pole in the cross-track direction. The overall angle is between about 25° and about 45° and the at least one current carrying element includes a bundle of carbon nanotubes, while a portion of the magnetic writing field emanates from edges of the main pole and is applied at an angle to perpendicular to the plane of the surface of the magnetic medium, wherein the angle to perpendicular is between about 10° and about 90°.

According to one embodiment, a recording method uses the assistance of a magnetic field applied along the in-plane direction (parallel to a surface of the medium, such as an upper surface, lower surface, etc.) in the presence of a magnetic field applied about perpendicular to the surface of the medium or to an angle with respect to the direction perpendicular to the surface of the medium.

In another embodiment, a magnetic recording head comprises a main pole that uses at least a set and/or bundle of wires to pass current and generate an assisting magnetic field to a media facing surface of a magnetic medium. According to a further embodiment, the set/bundle of wires may be comprise two or more sets or bundles of wires. The magnitude and direction of the current passed through the sets/bundles of wires may be controlled separately or as a single set/bundle. The set/bundle of wires may comprise a metallic carbon nanotubes in one approach. At ends of the set/bundle of wires, in one approach, at least two stacks of an electro-conductive metal connector layer above an insulator layer may be positioned, where the electro-conductive metal connector layer is directly connected to the set/bundle of current carrying wires. In another approach, the set/bundle of wires may be positioned on a trailing edge side of the main pole, on two edges of the trailing side of the main pole, etc. Furthermore, in some approaches, two sets/bundles of wires may be placed in between the main pole and a side shield.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

In one embodiment, a magnetic data storage system 100 may comprise at least one magnetic head 121 as described herein according to any embodiment, a magnetic recording medium 112, a drive mechanism 118 for passing the magnetic recording medium 112 over the at least one magnetic head 121, and a controller 129 electrically coupled to the at least one magnetic head 112 for controlling operation of the at least one magnetic head 112.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

According to one illustrative embodiment, a magnetic data storage system may comprise at least one magnetic head as described herein according to any embodiment, a magnetic medium, a drive mechanism for passing the magnetic medium over the at least one magnetic head, and a controller electrically coupled to the at least one magnetic head for controlling operation of the at least one magnetic head.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater element (Heater) may also be included in the magnetic heads shown in FIGS. 3A and 4A. The position of this heater may vary based on design parameters such as where the protrusion is desired, coefficients of thermal expansion of the surrounding layers, etc.

Figure 5:
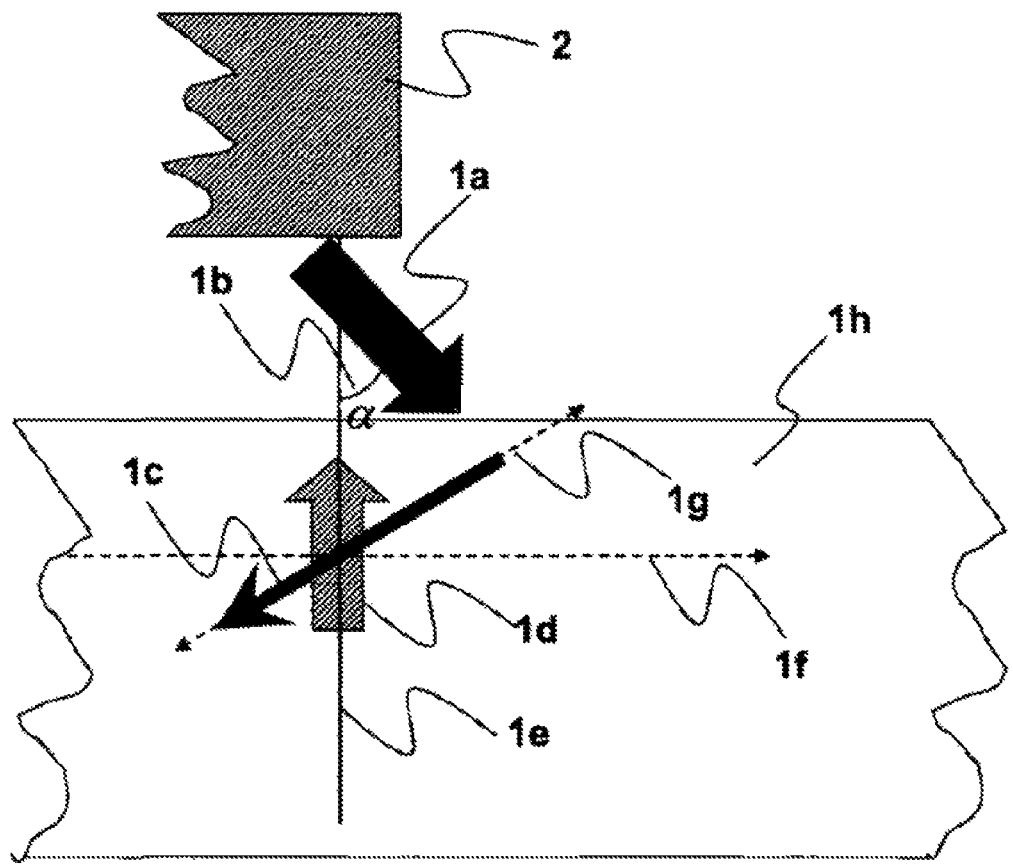
FIG. 5 illustrates a magnetic head and magnetic medium, according to one embodiment.

Now referring to FIG. 5, an assisted magnetic field device is described according to one embodiment. The assisting magnetic field is provided in a cross-track direction $1g$ parallel to a surface of the magnetic recording medium $1h$ (e.g., an in-plane direction) in the presence of a magnetic field $1a$ produced by a main pole 2 of a writer element (which may be included in a magnetic head, in one approach). In one embodiment, a magnetic field $1a$ emanates from the writer main pole 2 and is applied to the magnetic recording medium $1h$ at an angle α ($1b$) with respect to the cross-track direction $1g$, which lies along a plane of the surface of the medium $1h$ in a direction perpendicular to a down-track direction $1f$. A portion of the magnetic field $1a$ that emanates from a center portion of the main pole 2 is applied in a direction about perpendicular to a surface of the magnetic medium $1h$ (e.g., α~0°) while a portion of the magnetic field $1a$ that emanates from the edges of the main pole 2 is applied at an angle to the direction about perpendicular to the surface of the magnetic medium $1h$, for example in a tilted direction (e.g., α>0°).

Magnetization in current magnetic recording media possesses an uniaxial magnetic anisotropy, e.g., magnetization $1d$ in the magnetic medium $1h$ generally lies along the magnetic anisotropy axis $1e$, which is in the direction perpendicular to the surface of the magnetic medium 1h defined by the down-track direction 1f and the cross-track direction 1g. According to one embodiment, an assisting magnetic field 1c may be applied along the cross-track direction 1g to assist the writing magnetic field 1a from the main pole 2. If an isolated magnetic grain with a particular value of uniaxial magnetic anisotropy energy is considered, its switching field can readily be estimated. For example, if the magnetization 1d in FIG. 5 is considered to have the magnetic anisotropy energy $H_k$ of 1273 kA/m, a switching field of this magnetization may be estimated to be around 1273 kA/m through some simple calculation. In general, the maximum writing magnetic field 1a from the main pole 2 may be considered to be around 954 kA/m.

Figure 6A:
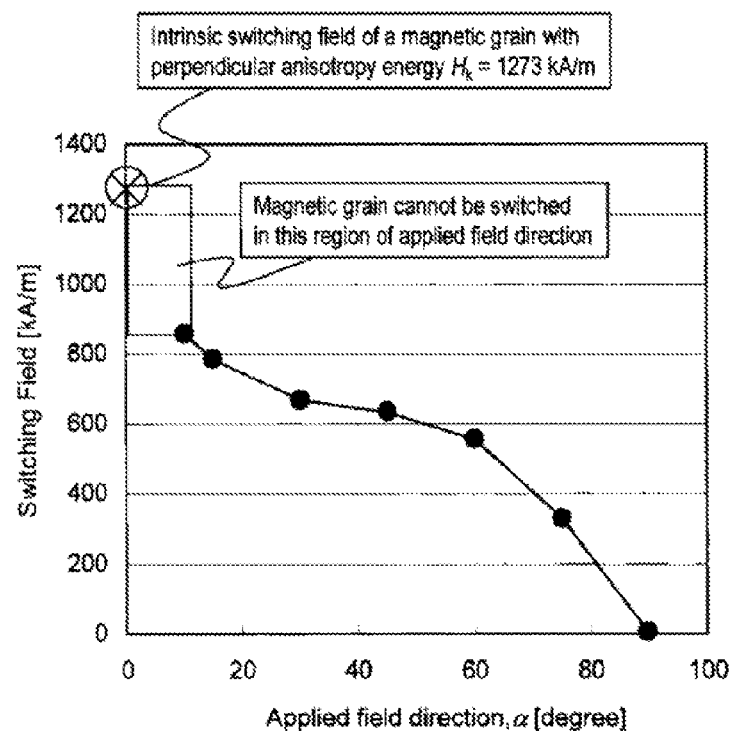
FIG. 6A is a chart depicting the change of the switching field of a single grain medium magnetization for different angles, according to one embodiment.
Figure 6B:
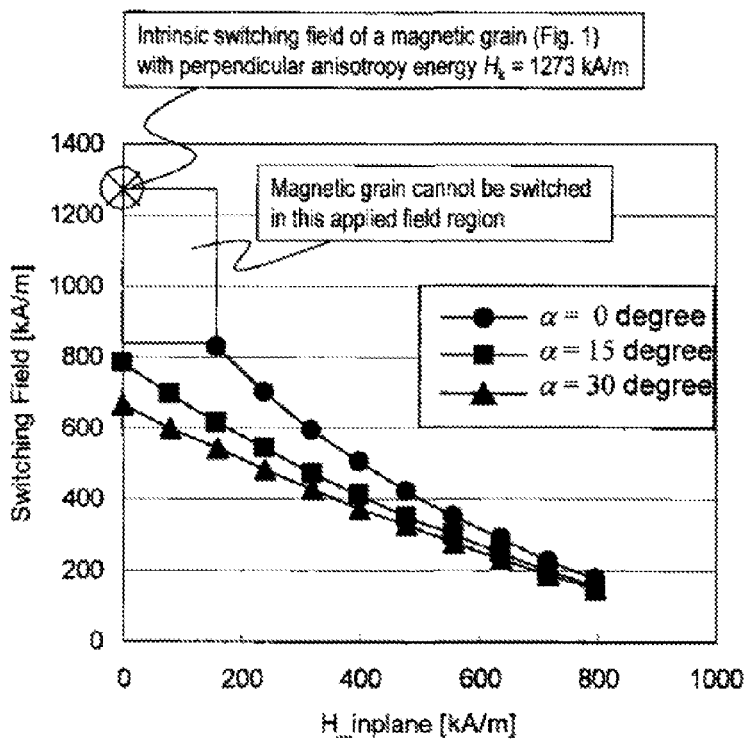
FIG. 6B is a chart depicting the change of the switching field of a single grain medium magnetization in the presence of an assisting magnetic field and a magnetic writing field applied at different angles, according to one embodiment.

FIG. 6A shows change of the switching field of the magnetization 1d (FIG. 5) having magnetic anisotropy energy of 1273 kA/m with change of the applied head field direction α. FIG. 6B states that in the applied field direction region of α<10°, it is not possible to switch the magnetization 1d (FIG. 5) with the magnetic anisotropy energy $H_k$ of 1273 kA/m to a reverse direction with the application of a magnetic field of 954 kA/m, in one approach. In the region α>0°, magnetization 1d (FIG. 5) may be switched and the switching field decreases non-linearly with an increase of α. The switching field of the magnetization 1d (FIG. 5) becomes the smallest for α~90°, e.g., when the field is applied along the direction parallel to the medium surface.

As shown in FIG. 6B, the switching field of magnetization with magnetic anisotropy energy Hk of 1273 kA/m may be changed in the presence of an assisting magnetic field while the maximum magnetic field from the main pole is considered to be around 954 kA/m. For α~0°, e.g., when the magnetic field from the main pole is applied to the perpendicular direction, there exists a region where the magnetization cannot be switched to the reverse direction even with an increase of the assisting magnetic field. However, beyond a certain magnitude, with increases of the assisting magnetic field, the switching field of magnetization decreases gradually. For instance, with the configuration α~0°, if an assisting magnetic field of around 238 kA/m is applied, the switching field of the magnetization reduces to around 700 kA/m from 1273 kA/m. With a larger value of α, e.g., for α>0° as shown in FIG. 6B, the switching field of the magnetization may be reduced further. For example, for α=30°, with the assistance of an assisting magnetic field of around 238 kA/m and in the presence of a magnetic field from the main pole of around 954 kA/m, the switching field of the magnetization may be reduced to around 480 kA/m, which is close to one third of the intrinsic switching field of 1273 kA/m of the magnetization. Thus, the application of an assisting magnetic field assists the magnetic field from the main pole, even if the magnetic field is far smaller than the intrinsic switching field of the magnetization. This implies that assistance of the assisting magnetic field enables an increase of magnetic anisotropy energy, which in consequence ensures better thermal stability of smaller grains in the medium.

Figure 7A:
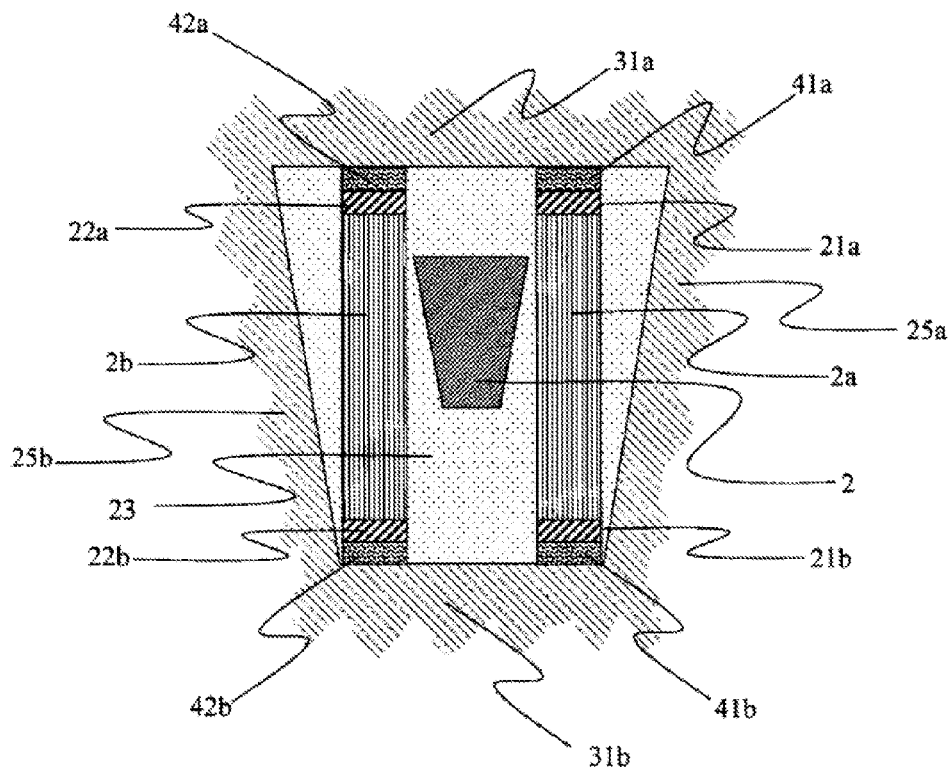
FIG. 7A is a depiction of an embodiment which comprises two sets/bundles of current carrying elements positioned on two sides of the main pole and in between the main pole and side shields.

In order to generate an assisting magnetic field for assisted magnetic recording, a current carrying element, which may be a single wire, a bundle or set of several wires, multiple bundles of wires, etc., may be placed near the writer main pole, in one embodiment. As shown in FIG. 7A, the main pole 2 is surrounded by magnetic shields, with side shields 25a and 25b being positioned along the dies while trailing shield 31a is positioned on a trailing edge side of the main pole 2 and leading shield 31b being positioned on a leading edge side of the main pole 2.

These shields may comprise magnetic materials, in one approach, as would be known to one of skill in the art. The space in-between the shields and the main pole 2 may be filled with non-magnetic insulator (e.g., a non electro-conductive) materials 23, which may be oxide materials, e.g., MgO, $Al_2O_3$, or any other oxide as would be known to one of skill in the art.

Figure 7B:
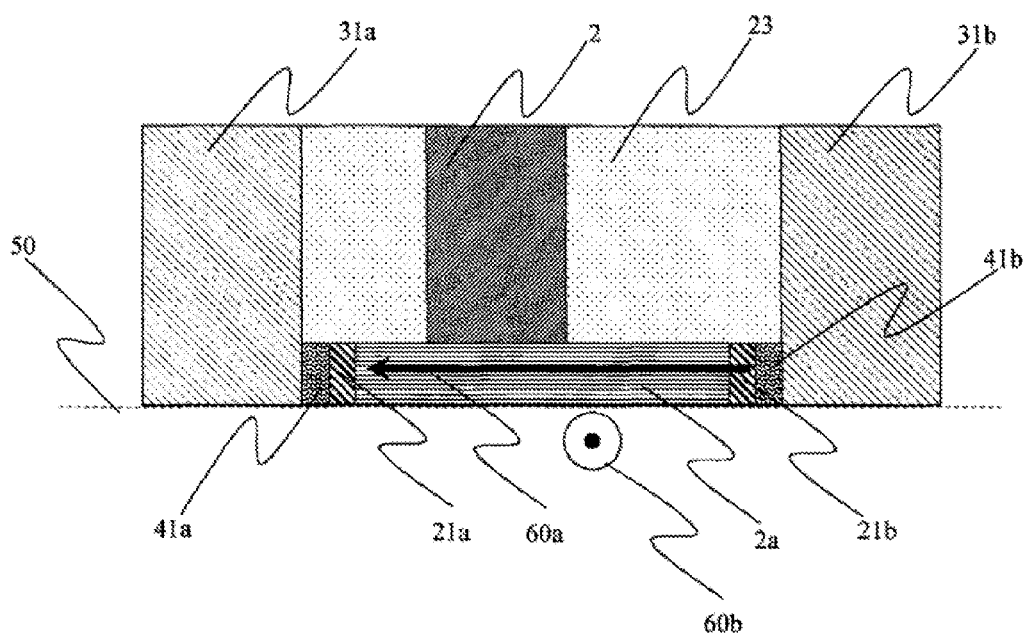
FIG. 7B is a side view of the structure in FIG. 7A, according to one embodiment.
Figure 7C:
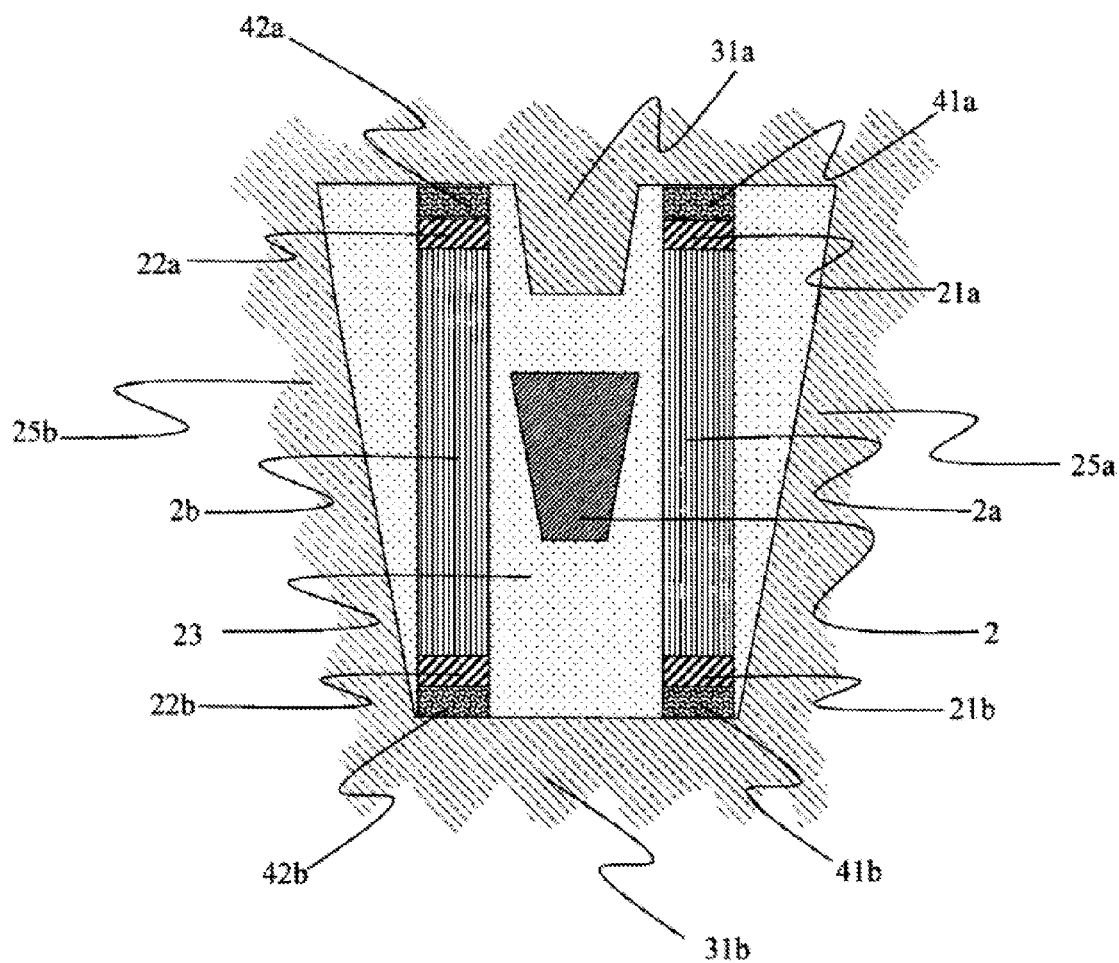
FIG. 7C is a depiction of an embodiment which comprises two sets/bundles of current carrying elements positioned on two sides of the main pole and in between the main pole and side shields.

As shown in FIG. 7B which is a side view of a magnetic head according to one embodiment, and FIG. 7C which is a media-facing view of a magnetic head according to one embodiment, two current carrying bundles of wires may be placed in-between the shields 31a, 31b and the main pole 2. One bundle of wires 2a may be placed in-between the side shield 25a and the main pole 2 with the axis of the bundle 2a lying in-between the trailing shield 31a and the leading shield 31b. In the trailing shield side, an insulator layer 41a may be placed in between the trailing shield 31a and an electro-conductive connector 21a, while in the leading shield side, an insulator layer 41b may be placed in-between the leading shield 31b and an electro-conductive connector 21b. Another bundle of wires 2b may be placed in-between the side shield 25b and the main pole 2 with the axis of the bundle lying in between the trailing shield 31a and the leading shield 31b. In the trailing shield side, an insulator layer 42a may be placed in-between the trailing shield 31a and an electro-conductive connector 22a, while in the leading shield side, an insulator layer 42b may be placed in-between the leading shield 31b and an electro-conductive connector 22b.

Insulator layers (41a, 41b, 42a, 42b) are used to prevent current from passing through the trailing shield 31a and leading shield 31b. Since shields are generally made of magnetic metal-based materials, there is the possibility that a magnetic field, due to the current passing through the trailing shield and leading shield, may change the magnetic domain orientation inside the shields, which results in degradation of the performance of the shield. Use of insulator layers (41a, 41b, 42a, 42b), according to one embodiment, prevent or substantially reduce the performance degradation of the magnetic field. However, if shield performance can be maintained even under the magnetic field produced from the current passing through the shields, the insulator layers may be excluded from the structure.

In operation, an alternating current (AC) or a direct current (DC) is passed through the bundle of wires 2a and 2b simultaneously or individually. In the case of a DC, the direction of the current is either from the leading shield side or from the trailing shield side. However, for both the bundle 2a and 2b, the direction of DC or the phase of AC may be the same. DC or AC passing through the bundle 2a and 2b generates a DC magnetic field or an AC magnetic field along the in-plane direction. An example is shown in FIG. 7B. FIG. 7B shows a device as seen from the side shield 25a side of FIG. 7A. If a DC 60a is passed through the bundle of wires 2a from the connector 21b to the connector 21a, an assisting magnetic field is generated in the media facing surface 50 and the direction of this assisting magnetic field is defined by 60b. The magnitude of the magnetic field due to the similar magnitude of current passed simultaneously through the bundle of wires 2a and 2b is larger than that due to the current passed through either of the bundles (e.g., either 2a or 2b).

Another arrangement of placing the current carrying bundles of wires is shown in FIG. 7C. There is a notch in the trailing shield side in between the positions where the two sets of current carrying bundles, connectors, and insulators are placed. This structure is beneficial for shingled magnetic recording, where tracks are written in shingled fashion and from a particular direction, e.g., from the outer side or the inner side of the medium. In shingled recording, a magnetic field from the edge of a writer is used since the recording is performed mainly at the edge of the main pole 2 when a track is written in a shingled fashion over a previously written neighboring track. For example, if shingled recording is performed from an inner side or the side shield 25b side, current is passed selectively only through the bundle of wires 2b, while the bundle of wires 2a is kept inactive (e.g., no current is passed through the bundle of wires 2a) and vice versa.

Figure 8A:
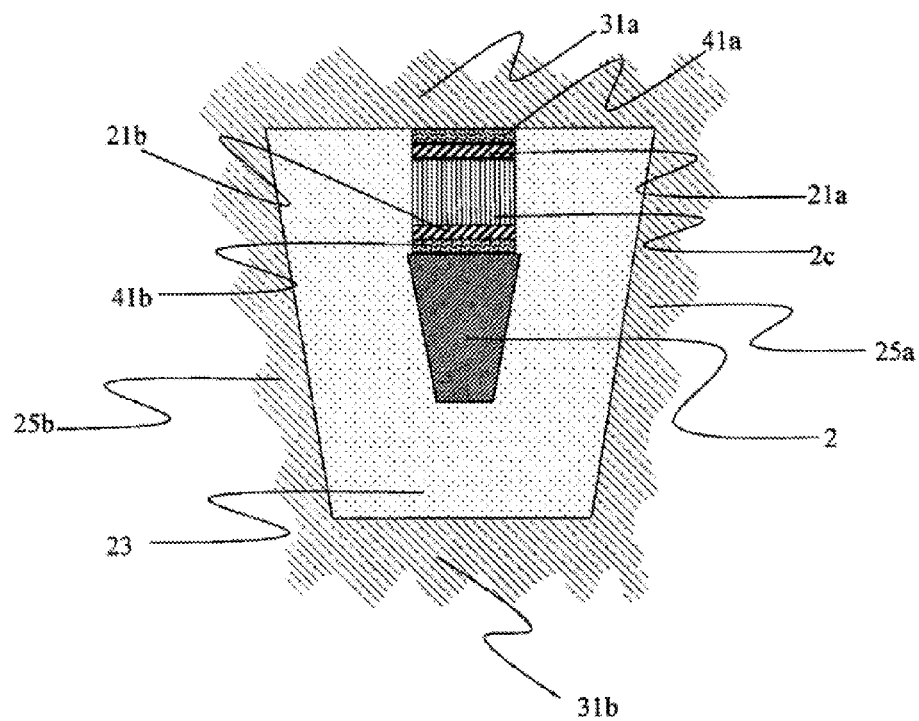
FIG. 8A is a depiction of an embodiment with a set/bundle of current carrying elements positioned on a trailing side edge of the main pole, according to one embodiment.

Another arrangement to generate an assisting magnetic field is shown in FIG. 8A. As shown in FIG. 8A, a bundle of wires 2c may be placed in-between the trailing shield 31a and the trailing side of the main pole 2. An insulator layer 41b is placed on the trailing side of the main pole 2 in order to prevent current passing through the main pole 2. This insulator layer 41b is used to prevent the change of the magnetic field configuration in the main pole 2 due to the magnetic field produced from the current passing through the main pole 2. An electro-conductive connector 21b is placed on top of the insulator layer 41b and then, the bundle of current carrying wires 2c is placed on top of the connector 21b, then another electro-conductive connector 21a is placed at the end of the bundle 2c. In between the connector 21a and the trailing shield 31a, another insulator layer 41a is placed to prevent current from passing through the trailing shield. This insulator layer 41b may be excluded if the effect of the magnetic field due to the current passing through the trailing shield does not degrade the performance of the shield.

Figure 8B:
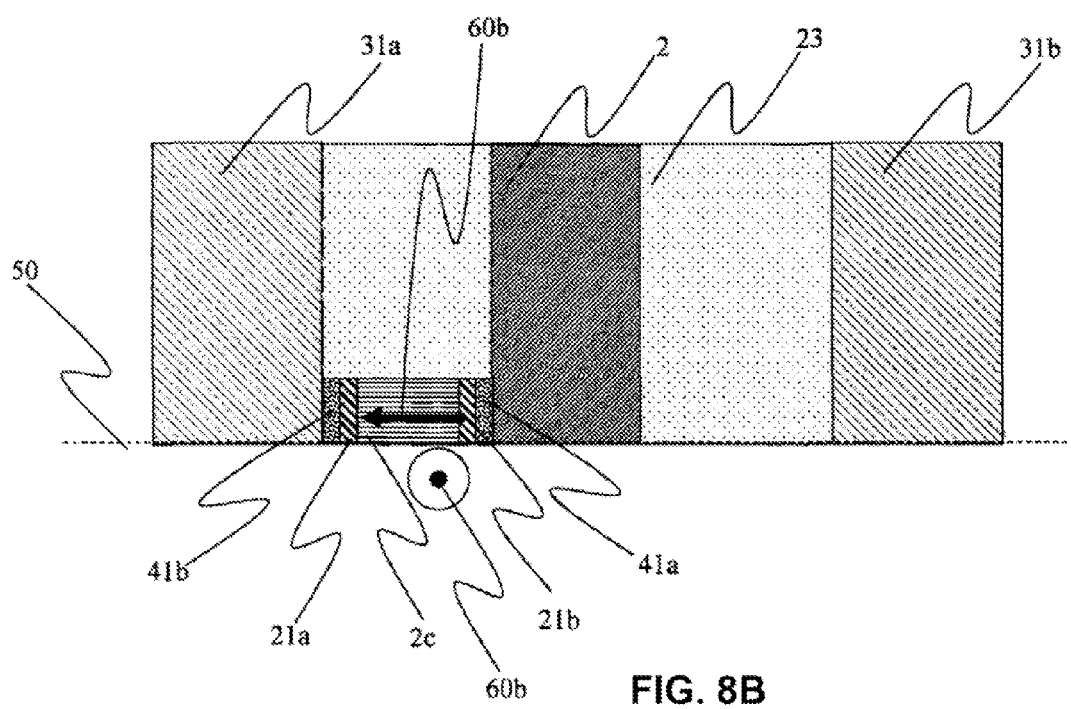
FIG. 8B is a side view of the structure in FIG. 8A, according to one embodiment.

FIG. 8B shows a side view of the configuration shown in FIG. 8A and as seen from the side shield side of 25a. As described earlier, a DC or an AC is passed through the bundle of wires 2c in order to generate an assisting magnetic field. For example in FIG. 8B, if a DC 60a is passed through the bundle of wires 2c from the connector 21b to the connector 21a, an assisting magnetic field is generated in the media facing surface 50 and the direction of the assisting magnetic field is defined by 60b.

Figure 9A:
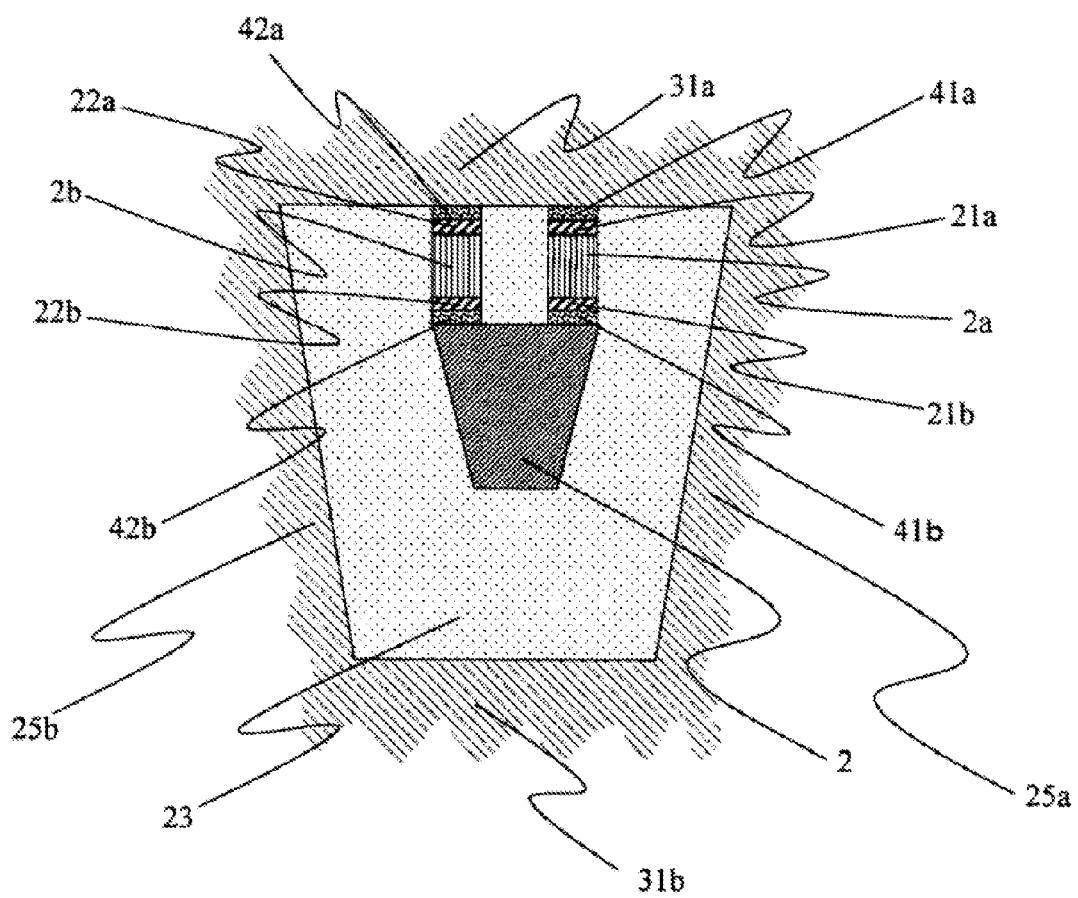
FIG. 9A is a depiction of an embodiment which comprises two sets/bundles of current carrying elements positioned on a trailing edge side of the main pole.

Another embodiment of arranging the bundle of wires to generate an assisting magnetic field is shown in FIG. 9A. Two bundles of wires are placed on the two edges of the trailing side of the main pole 2—one (2a) on the side shield 25a side and another one (2b) is on the side shield 25b side. On the trailing edge of the main pole 2 close to the side shield 25a side, an insulator layer 41b is placed. An electro-conductive connector 21b is placed on the insulator layer 41b and then, the current carrying bundle of wires 2a is placed on connector 21b and then, another electro-conductive connector 21a is place on the bundle of wires 2a and then, another insulator layer 41a is placed in between the trailing shield 31a and connector 21a. A similar structure is placed on the trailing edge of the main pole 2 close to the side shield 25b side.

Referring now to FIGS. 5 and 7A-7C, according to one embodiment, a magnetic head may comprise a main pole 2 configured to produce a magnetic writing field 1a applied to a magnetic medium 1h at an angle α (1b) with respect to about perpendicular to a plane of a surface of the magnetic medium 1h and at least one current carrying element (2a, 2b) positioned near a media facing surface of the main pole 2 configured to produce an assisting magnetic field 1c in a cross-track direction 1g and along the plane of the surface of the magnetic medium 1h, an insulator layer 23 between the two current carrying elements (2a, 2b) and the main pole 2, electro-conductive connectors (21a, 21b, 22a, 22b) positioned on each longitudinal end of the two current carrying elements (2a, 2b), a trailing shield 31a positioned on a trailing side of the main pole 2, a leading shield 31b positioned on a leading side of the main pole 2, and side shields (25a, 25b) positioned on either side of the main pole 2 in the cross-track direction.

Figure 9B:
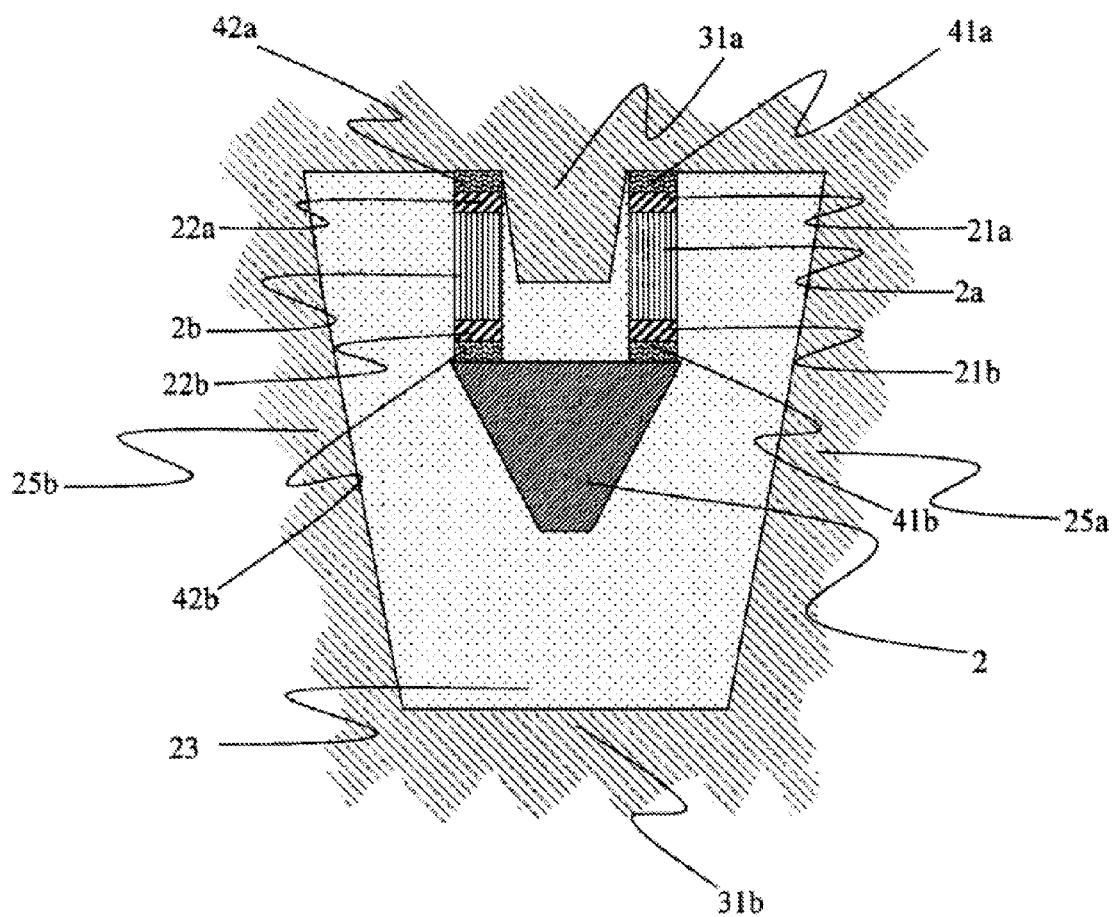
FIG. 9B is a depiction of an embodiment which comprises two sets/bundles of current carrying elements positioned on a trailing edge side of the main pole.

A variation of the structure shown in FIG. 9A is shown in FIG. 9B. Two bundles of wires may be placed on the two edges of the trailing side of the main pole while the trailing shield 31a possesses a notch in between the two current carrying bundles of wires. Such kind of structure may be beneficial for shingled recording, where the direction and the magnitude of the current passing through the bundle of wires 2a and 2b may be controlled separately.

The structure shown in FIG. 7C and FIG. 9B is advantageous to shingled writing and conventional (un-shingled) writing under skewed conditions, especially while recording in the inner or the outer side of the medium. The magnitude and direction of the current passed simultaneously through the bundle of wires 2a and 2b may be different and adjusted separately. This current control may produce an asymmetric magnetic field distribution, which may be helpful to achieve better writability, especially where the performance in the edge region is concerned.

In order to achieve a sufficient assisting magnetic field in the media facing surface, sufficient current is passed through the bundles of wires described above. These wires may comprise carbon nanotubes (CNTs). Metallic CNTs are generally known as a good electric conductor and capable of carrying current density up to $10^9$-$10^{10}$ A/cm$^2$, which is more than 1,000 times larger than that of metals such as copper. CNTs may be deposited by chemical vapor deposition (CVD) in the presence of a catalyst or by a DC magnetron sputtering method and may be deposited on a metal layer. Moreover, CNTs may be deposited on metal substrates in a vertical fashion by optimizing process conditions. Length, diameter, and number of CNTs in a bundle may be optimized through process optimization. Electro-conductive connectors (21a, 21b, 22a, 22b) described herein may comprise metal thin films of copper, gold, or any other metals as would be known to one of skill in the art, on which CNT bundles to carry current are deposited. If desired, etching may be applied on CNT bundles to adjust the length or the number of tubes in a bundle. Since the maximum current density allowed for copper or gold is much lower than that for CNTs, surface area of the metal connectors (21a, 21b, 22a, 22b) may be sufficiently larger than the total surface area of the CNT bundles. $Al_2O_3$ or other electrically insulator material may be used as the insulator layer (41a, 41b, 42a, 42b) described herein.

Figure 10A:
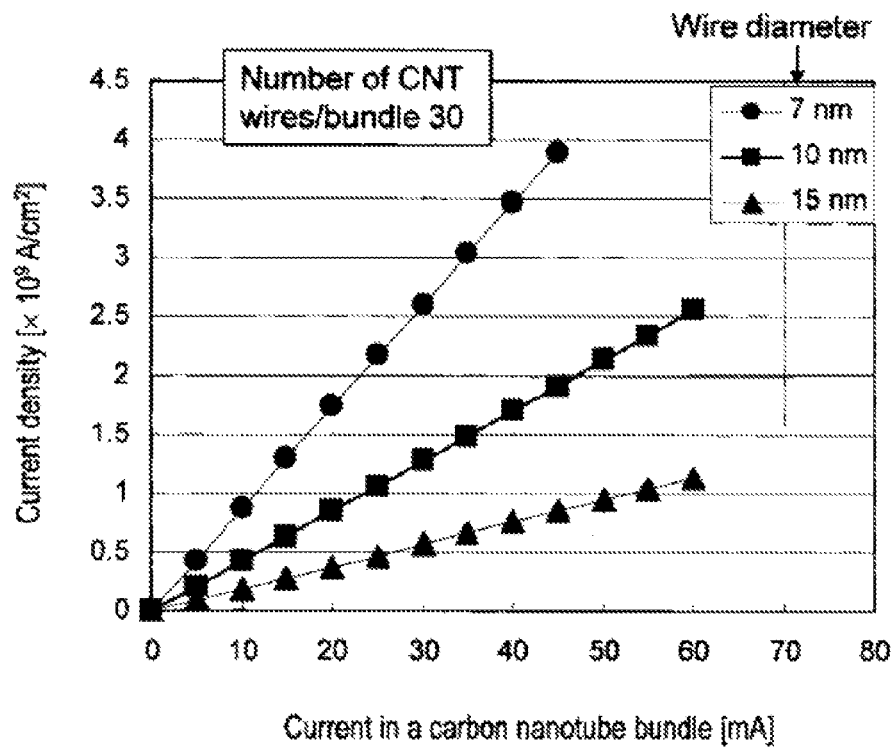
FIG. 10A is a chart depicting the change of current density with respect to current passed through a set/bundle of 30 wires, according to one embodiment.
Figure 10B:
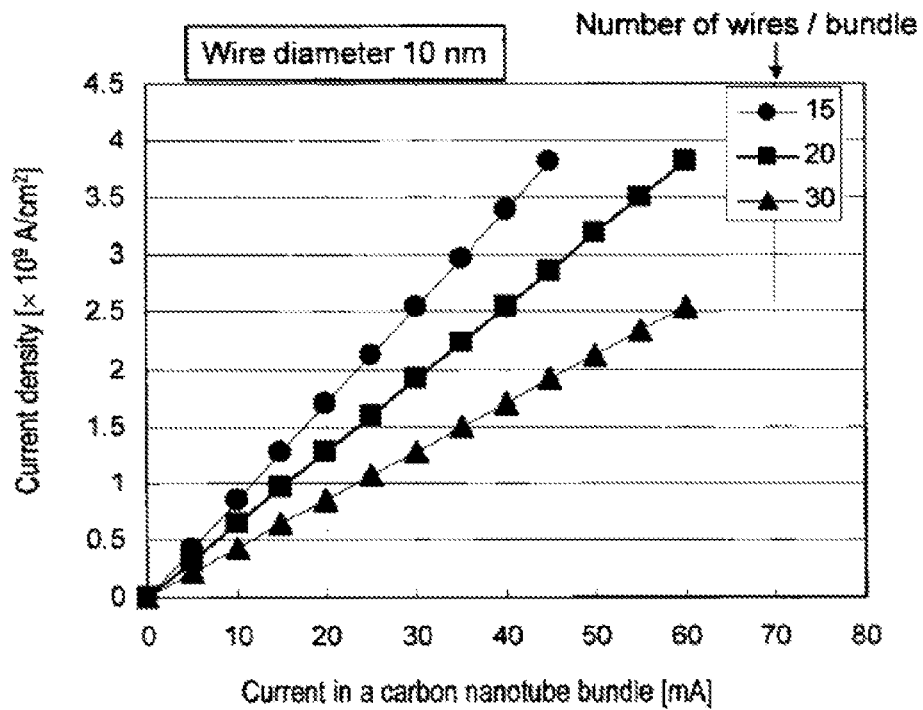
FIG. 10B is a chart depicting the change of current density with respect to current passed through a set/bundle of various numbers of 10 nm diameter wires, according to one embodiment.

Current density in the CNT bundle may be optimized by changing the number of CNT wires and diameter of each wire, in two approaches. FIG. 10A shows change of current density in a CNT wire for different diameters and for a bundle with 30 wires. FIG. 10B shows change of current density in a CNT wire with a diameter of 10 nm for different numbers of wires in a bundle. The number of CNT wires in a bundle and diameter of the wires may be adjusted in order to achieve a sufficient assisting magnetic field under the limit of an allowed maximum current density.

Figure 11A:
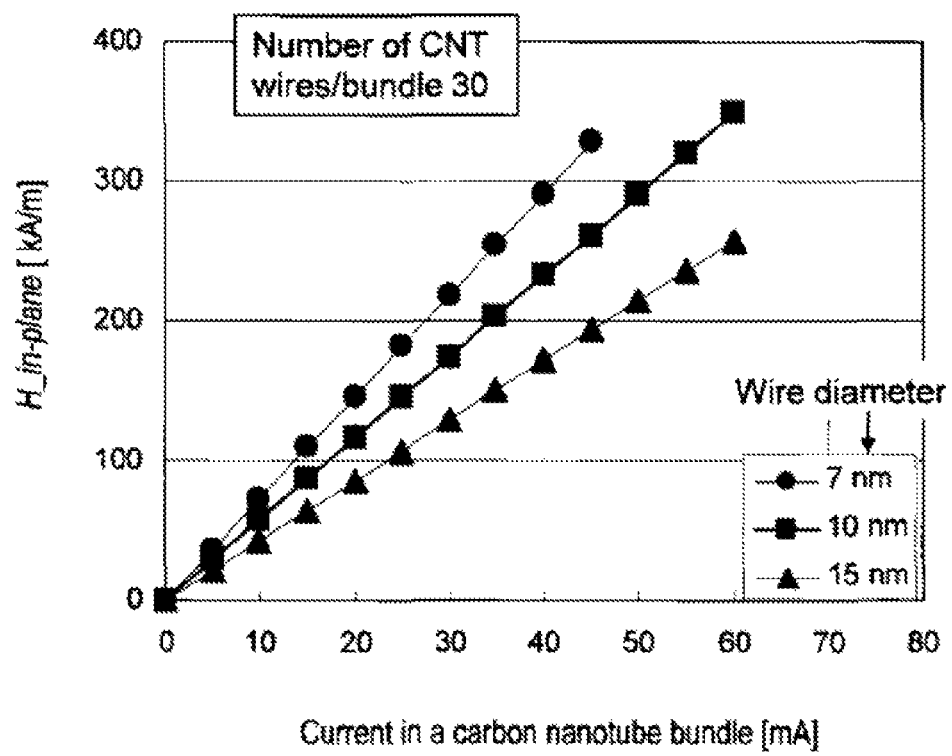
FIG. 11A is a chart depicting the change of an assisting magnetic field with respect to current passed through a set/bundle of 30 wires having different wire diameters, according to one embodiment.
Figure 11B:
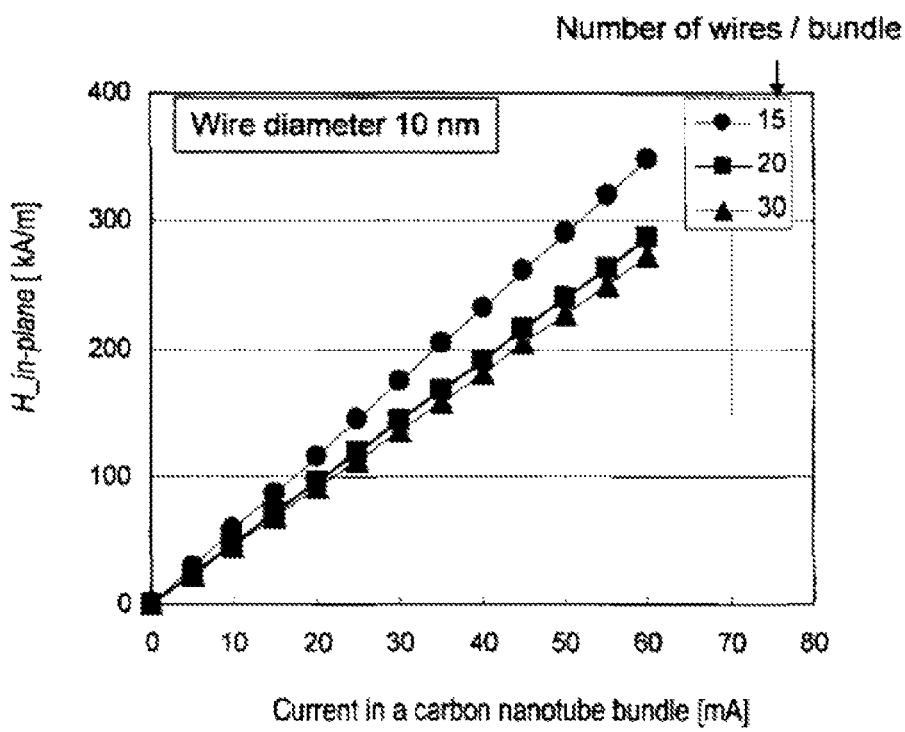
FIG. 11B is a chart depicting the change of an assisting magnetic field with respect to current passed through a set/bundle of various numbers of 10 nm diameter wires, according to one embodiment.

FIG. 11A shows change of the assisting magnetic field, H_in-plane generated by the current passed through a bundle of 30 CNT wires, each bundle having wires of various diameters. FIG. 11B shows change of the assisting magnetic field H_in-plane due to the current passed through a bundle of 10 nm diameter CNT wires, with each bundle having a different number of wires.

Figure 12:
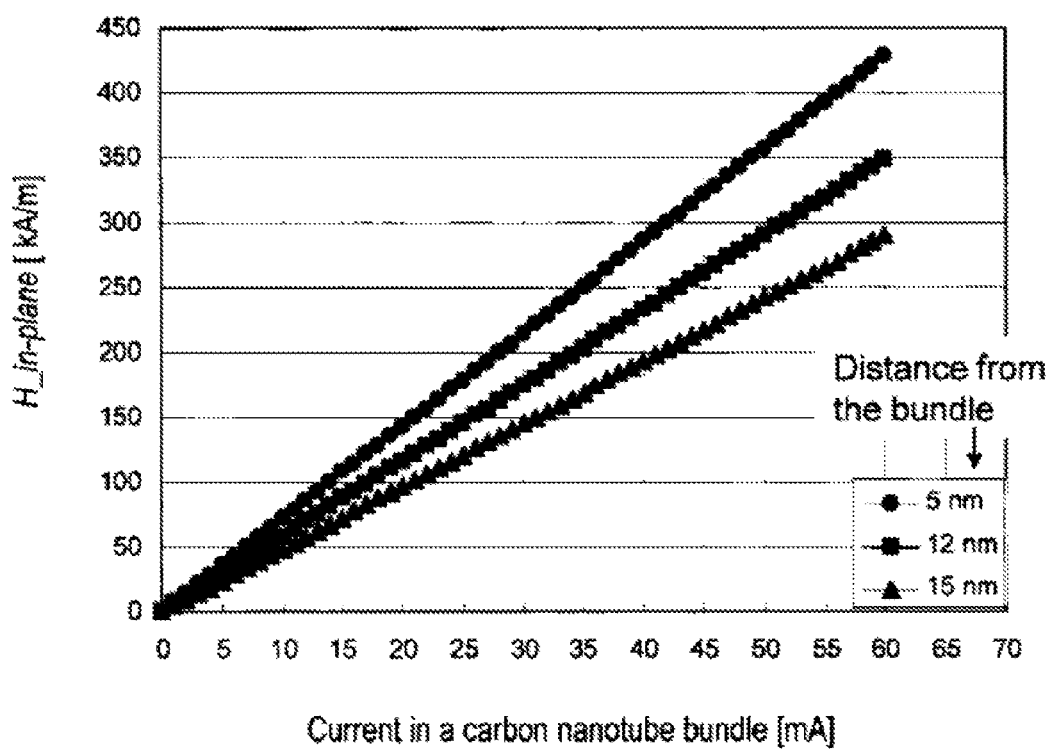
FIG. 12 is a chart depicting the change of an assisting magnetic field with respect to current passed through a set/bundle of 15 wires having 10 nm diameters for different distances away from the set/bundle, according to one embodiment.

FIG. 12 shows change of the assisting magnetic field, H_in-plane with current passing through a CNT bundle at different distances away from the CNT bundle. The bundle comprises 15 CNT wires each having a diameter of 15 nm. Length of each wire is about 200 nm. For a particular value of current, H_in-plane decreases with an increase of distance away from the bundle. For example, if 30 mA of current is passed through the bundle, around 174 kA/m of assisting magnetic field is achieved at a point 12 nm away from the bundle in the media facing surface side (e.g., the field 60b shown in FIG. 7B and FIG. 8B). If two bundles are considered for the configuration shown in FIG. 7C and 30 mA of current is passed separately in two different CNT bundles, around 340 kA/m of assisting magnetic field is achieved at a point 12 nm away from the bundle in the media facing surface side (e.g., the field 60b shown in FIG. 7B and FIG. 8B). Such an assisting magnetic field is advantageous to reverse the magnetization with a switching field higher than the field from the main pole as shown FIG. 6B.

Figure 13:
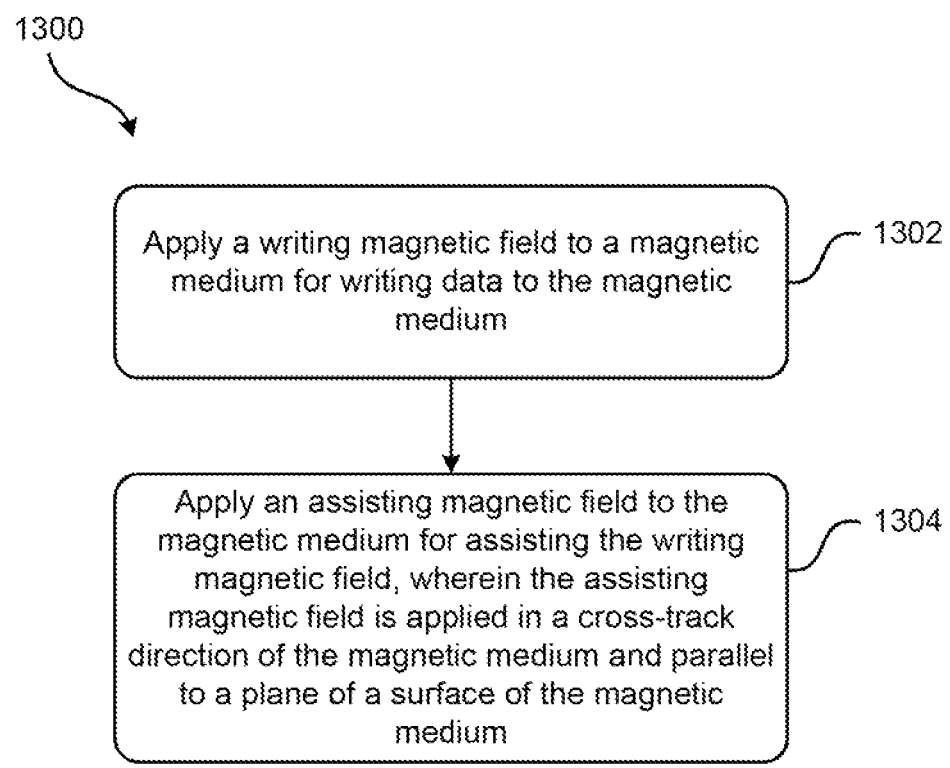
FIG. 13 is a flowchart of a method, according to one embodiment.

Now referring to FIG. 13, a method 1300 is shown according to one embodiment. The method 1300 may be carried out in any desired environment, including those shown in FIGS. 1-12, among others, as would be understood by one of skill in the art upon reading the present descriptions. Of course, more or less operations than those described in FIG. 13 may be included in the method 1300, as would be understood by one of skill in the art, according to various embodiments.

In operation 1302, a writing magnetic field is applied to a magnetic medium for writing data to the magnetic medium. The writing magnetic field may be applied using a main pole of a magnetic head, which may be configured to produce a magnetic writing field in a direction about perpendicular to the surface of the magnetic medium (which is the direction of magnetic anisotropy of the magnetic medium) or at an overall angle with respect to the direction about perpendicular to the surface of the magnetic medium, according to various embodiments.

In one embodiment, the writing magnetic field may be produced by the main pole and a portion thereof may be applied in the direction about perpendicular to the surface of the magnetic medium. However, according to one embodiment, a portion of the magnetic writing field may emanate from a center portion of the main pole and may be applied to the direction about perpendicular to the surface of the magnetic medium, while a portion of the magnetic writing field may emanate from edges of the main pole and may be applied at an angle to perpendicular to the surface of the magnetic medium. The angle to perpendicular may be from about 1° to about 90°, such as from about 10° to about 90°, more specifically, from about 25° to about 45°, such as about 30°, according to various embodiments.

In some further embodiments, the overall angle may be from about 25° to about 45°, such as about 30°, according to one embodiment.

In operation 1304, an assisting magnetic field is applied to the magnetic medium for assisting the writing magnetic field. The assisting magnetic field is applied in a cross-track direction of the magnetic medium and parallel to a plane of a surface of the magnetic medium, according to one approach.

In one embodiment, the assisting magnetic field may be produced by at least one current carrying element positioned near a media facing surface of the main pole. The current carrying element may be configured to produce the assisting magnetic field, among other functions. In one approach, the current carrying element may comprise a set or bundle of wires, the wires comprising a conductive material. The conductive material may be any conductive material as known in the art that is suitable for producing the assisting magnetic field, such as gold, copper, platinum, etc.

In one approach, the conductive material may comprise metallic carbon nanotubes of a type known in the art.

In one embodiment, the at least one current carrying element may comprise a bundle of wires positioned longitudinally inline with a down-track direction on a trailing side of the main pole.

In another approach, a magnitude and/or a direction of current passed through a plurality of current carrying elements may be individually controllable for each current carrying element.

The at least one current carrying element, in one approach, may comprise two bundles of carbon nanotubes positioned on either side of the main pole in the cross-track direction. In another approach, the bundles may be positioned on a trailing side of the main pole in a down-track direction. Of course, any other position which provides a suitable assisting magnetic field may be used, as would be understood by one of skill in the art upon reading the present descriptions.

In another embodiment, two current carrying elements may be positioned longitudinally inline with the down-track direction on either side of the main pole in the cross-track direction, thereby being positioned lengthwise inline with the direction of media movement along each side of the main pole.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
   a magnetic recording medium; and
   a magnetic head, comprising:
      a main pole configured to produce a magnetic writing field applied to a magnetic medium at an overall angle with respect to a magnetic anisotropy axis, the magnetic anisotropy axis being oriented in a direction perpendicular to a plane of a surface of the magnetic medium; and
      at least one current carrying element positioned near a media facing surface of the main pole configured to produce an assisting magnetic field applied in a cross-track direction parallel to the plane of the surface of the magnetic medium.

2. The system as recited in claim 1, wherein a portion of the magnetic writing field emanates from a center portion of the main pole and is applied to the magnetic medium in a direction about perpendicular to the surface of the magnetic medium.

3. The system as recited in claim 1, wherein a portion of the magnetic writing field emanates from edges of the main pole and is applied to the magnetic medium at an angle to perpendicular to the surface of the magnetic medium, wherein the angle to perpendicular is greater than 0°.

4. The system as recited in claim 3, wherein the angle to perpendicular is between about 10° and about 90° and the overall angle is between about 25° and about 45°.

5. The system as recited in claim 3, wherein the angle to perpendicular is between about 25° and about 45° and the overall angle is about 30°.

6. The system as recited in claim 1, wherein the at least one current carrying element comprises a bundle of wires, the wires comprising a conductive material, wherein each wire in the bundle is oriented in about a same direction.

7. The system as recited in claim 6, wherein the conductive material comprises carbon nanotubes.

8. The system as recited in claim 1, wherein an entire portion of two current carrying elements positioned near the media facing surface of the main pole are positioned longitudinally inline with a down-track direction on either side of the main pole in a cross-track direction.

9. The system as recited in claim 8, the magnetic head further comprising:
- an insulator layer between the two current carrying elements and the main pole;
- electro-conductive connectors positioned on each longitudinal end of the two current carrying elements;
- a trailing shield positioned on a trailing side of the main pole;
- a leading shield positioned on a leading side of the main pole; and
- side shields positioned on either side of the main pole in the cross-track direction.

10. The system as recited in claim 1, wherein the at least one current carrying element comprises a bundle of wires positioned longitudinally inline with a down-track direction on a trailing side of the main pole.

11. The system as recited in claim 10, the magnetic head further comprising:
- an electro-conductive connector positioned on each longitudinal end of the bundle of wires;
- an insulator layer positioned between one electro-conductive connector and the main pole;
- a trailing shield positioned on a trailing side of the main pole; and
- an insulator layer positioned between another electro-conductive connector and the trailing shield.

12. The system as recited in claim 1, wherein a magnitude and/or a direction of current passed through a plurality of current carrying elements is individually controllable for each current carrying element.

13. The system as recited in claim 1, further comprising:
- a drive mechanism for passing the magnetic recording medium over the magnetic head; and
- a controller electrically coupled to the magnetic head for controlling operation of the magnetic head.

14. A method, comprising:
- applying a writing magnetic field to a magnetic medium for writing data to the magnetic medium; and
- applying an assisting magnetic field to the magnetic medium for assisting the writing magnetic field, wherein the assisting magnetic field is only applied in a cross-track direction of the magnetic medium and parallel to a plane of a surface of the magnetic medium.

15. The method as recited in claim 14, wherein the writing magnetic field is produced by a main pole of a magnetic head and a portion thereof is applied to the magnetic medium in a direction about perpendicular to the surface of the magnetic medium.

16. The method as recited in claim 14, wherein the writing magnetic field is produced by a main pole of a magnetic head and a portion thereof is applied to the magnetic medium at an angle with respect to a direction about perpendicular to the surface of the magnetic medium.

17. The method as recited in claim 14, wherein the assisting magnetic field is produced by at least one current carrying element positioned near a media facing surface of a main pole of a magnetic head.

18. The method as recited in claim 17, wherein the at least one current carrying element comprises two bundles of carbon nanotubes being positioned on either side of the main pole in the cross-track direction.

19. The method as recited in claim 17, wherein the at least one current carrying element comprises at least one bundle of carbon nanotubes being positioned on a trailing side of the main pole in a down-track direction.

20. A magnetic data storage system, comprising:
- a magnetic medium;
- at least one magnetic head;
- a drive mechanism for passing the magnetic medium over the at least one magnetic head; and
- a controller electrically coupled to the at least one magnetic head for controlling operation of the at least one magnetic head, wherein the at least one magnetic head comprises:
- a main pole configured to produce a magnetic writing field applied to the magnetic medium at an overall angle with respect to a magnetic anisotropy axis which is in a direction perpendicular to a plane of a surface of the magnetic medium;
- two bundles of carbon nanotubes capable of carrying current substantially positioned longitudinally inline with a down-track direction on either side of the main pole in a cross-track direction near a media facing surface of the main pole, the bundles of carbon nanotubes being configured to produce an assisting magnetic field applied only in a cross-track direction parallel to the plane of the surface of the magnetic medium,
- wherein the overall angle is between about 25° and about 45°,
- an insulator layer positioned between each bundle of carbon nanotubes and the main pole;
- electro-conductive connectors positioned on each longitudinal end of each bundle of carbon nanotubes;
- a trailing shield positioned on a trailing side of the main pole;
- a leading shield positioned on a leading side of the main pole; and
- side shields positioned on either side of the main pole in the cross-track direction,
- wherein a portion of the magnetic writing field emanates from edges of the main pole and is applied at an angle to perpendicular to the plane of the surface of the magnetic medium, wherein the angle to perpendicular is between about 10° and about 90°.

* * * * *

UNITED STATES PATENT AND TRADEMARK OFFICE
CERTIFICATE OF CORRECTION

| | |
|---|---|
| PATENT NO. | : 8,786,984 B2 |
| APPLICATION NO. | : 13/297106 |
| DATED | : July 22, 2014 |
| INVENTOR(S) | : Das et al. |

Page 1 of 1

It is certified that error appears in the above-identified patent and that said Letters Patent is hereby corrected as shown below:

In the specification:

col. 9, line 2 replace "if" with --1f--.

Signed and Sealed this
Fourteenth Day of October, 2014

Michelle K. Lee
*Deputy Director of the United States Patent and Trademark Office*